United States Patent [19]

Langhammer et al.

[11] 4,155,294
[45] May 22, 1979

[54] COOKING APPARATUS FOR FOODSTUFFS

[75] Inventors: Jerome Langhammer; Richard C. Winkler, both of Toronto, Canada

[73] Assignee: Rotofry Systems, Inc., Rexdale, Canada

[21] Appl. No.: 844,628

[22] Filed: Oct. 25, 1977

[51] Int. Cl.² ............................................. A47J 37/04
[52] U.S. Cl. ................................... 99/427; 99/443 R; 99/447; 99/450; 219/370; 219/389; 219/400
[58] Field of Search ................. 99/447, 427, 483, 348, 99/443 R, 450; 219/400, 399, 389, 405, 370

[56] References Cited
U.S. PATENT DOCUMENTS

| 1,993,607 | 3/1935 | Kalgren | 99/427 |
| 2,004,775 | 6/1935 | Wright | 99/427 |
| 3,870,193 | 3/1975 | Schneider | 99/427 |
| 4,068,572 | 1/1978 | Vogt | 99/447 |

FOREIGN PATENT DOCUMENTS

| 2448402 | 4/1976 | Fed. Rep. of Germany | 99/427 |
| 2448403 | 4/1976 | Fed. Rep. of Germany | 99/427 |

Primary Examiner—Billy J. Wilhite

[57] ABSTRACT

A housing encloses a rotatable apertured cage containing foodstuffs is located to be rotated in air heated and impelled to pass through the cage. In one aspect of the invention the impeller is laterally displaced from the cage. In another aspect of the invention the cage is formed as a drawer designed to be withdrawn from the housing to allow loading and unloading the foodstuffs therein and designed to close the housing when inserted for rotation.

3 Claims, 4 Drawing Figures

COOKING APPARATUS FOR FOODSTUFFS

This invention relates to means for the cooking of foodstuffs often known as greaseless frying.

The invention deals with the cooking of foodstuffs exposed to a heated gas which is heated and impelled through a housing wherein there is a rotatable container containing the foodstuffs.

The most relevant prior art known to applicant is Canadian Pat. No. 887,585 to Vogt. This patent shows apparatus for greaseless cooking including an impeller for the gas at the top of a housing. A bell is located inside and spaced from the walls of the housing. The food to be cooked is located to be tumbled inside the bell. The impeller is located over an opening at the upper end of the bell and draws the gases up through the bell and drives it downwardly between the bell and walls of the housing. The gases are heated. The arrangement of Vogt has numerous disadvantages. Location of the impeller over the rising heated gases from the food is extremely deleterious to the impeller bearings, and parts, and the motor windings and wiring shortens the life of these members. Location of the foodstuffs in the bell renders the insertion and removal of the foodstuffs inconvenient. The Vogt apparatus, moreover, is thought to be unhygenic, for practical purposes, since the bell is nearly impossible to clean.

This invention, in one facet, provides a housing with a food container rotatably mounted therein about an axis which is more horizontal than vertical and apertures in the container so that heated gases may be circulated through the container, an impeller for causing such circulation of the gases laterally disposed from the container and means for heating the gases impelled by the impeller. The lateral disposal of the impeller relative to the food container means that the hottest gases rising from the foodstuffs do not do equivalent damage to the impeller, motor, bearings and parts. Moreover, the lateral disposal of the impeller, relative to the food container, provides, in the whole unit, a low profile suitable for convenient location on a counter or table in a restaurant or equivalent food dispensing location.

The device is relatively easy to clean compared to the bell arrangement of Vogt.

The invention, in another facet, provides a rotatably mounted food container, apertured to allow the passage of gases therethrough wherein the rotatably mounted food container is supported so as to be easily withdrawn (between cooking operations) through a wall of the housing. The rotatable container is provided with cover means which close the removal aperture in the housing when the container is in place. This facet of the invention therefore provides a convenient and efficient means for insertion and removal of successsive batches of the foodstuffs to be cooked.

In drawings which illustrate preferred embodiments of the invention:

Figure 1:
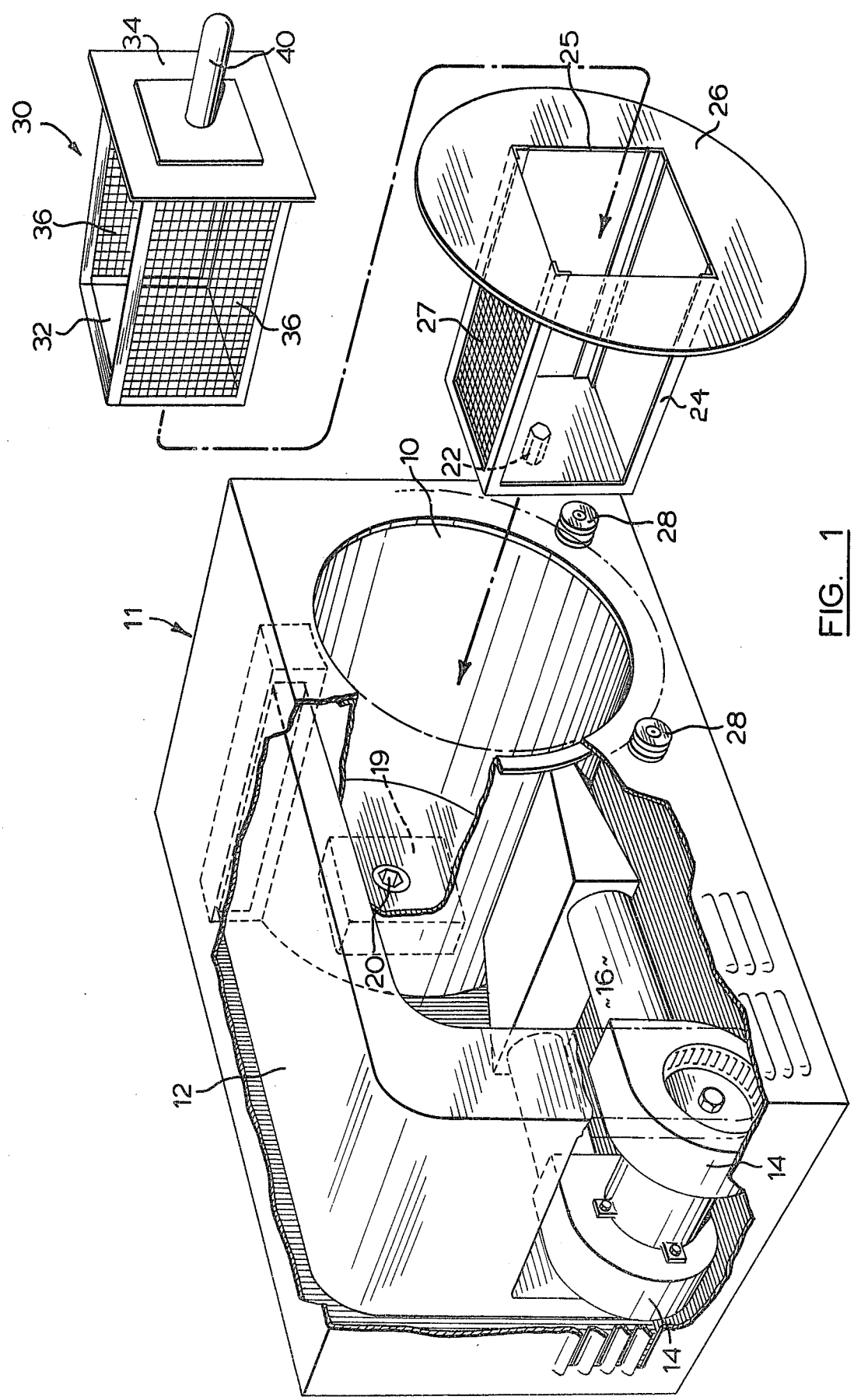
FIG. 1 shows a partially broken away perspective view of one form of the invention.

In the drawings, a housing 11 defined by side top and end walls is provided at one lateral end with a cylindrical cooking area defined by cylindrical wall 10 and the rear side wall of the housing, (the axis of the cylinder being horizontal) and at the other end with gas impellers, here centrifugal fans 14. An opening 15 extends most of the length of the top of the cylindrical wall 10 and a duct 12 is shaped to conduct gases passing upwardly through such opening to the input of the fans 14. The output of the fans is conducted through twin conducts 16 over heating elements 18 to a longitudinally extending opening 17 in the side of the cylindrical wall 10 below the centre line. Obviously the twin conducts 16 may be replaced by a single conduit or the twin fans by a single fan, or both. The front end of the cylindrical area defined by wall 10 is open and at the opposite end a rotor drive, powered by a suitable electric motor 19, drives a shaft defining at its end the socket 20 for coupling to the food container. The food container has apertured sides, preferably, a wire mesh. The construction shown provides a frame 24, square, when viewed from the front, having open sides and bottom and a mesh top covered with mesh 27 and an end wall with a stub projection 22 to be received in and key to the rotor socket 20. Although the frame is square with a drawer of complementary cross-section, it will be obvious that, the frame and its drawer may be made of round or polygonal or other shape. (Obviously the rotor driven end may be provided with the stub and the frame with the socket or any alternate method of driving the frame may be used). The frame 24 is provided, at its outer end, with a rectilinear open end 25 shaped to allow a drawer to be slid into the frame open end, through the circular opening in the housing. A circular plate 26 is mounted on the frame to surround the rectilinear opening therein and plate 26 adapted to overlap the edges of the opening in the housing and to rest and rotate on two idler rollers 28 which are rotatably mounted on the casing and grooved to receive the edge of the circular plate 26. It will be seen that the frame is supported for rotation by the stub 22 and socket 20 at the inner end and, at the outer end, by the plate 26 and rollers 28. Further it will be seen that the frame 24 may be easily withdrawn for cleaning by lifting it off the rollers 28 and withdrawing the stub 22 from the socket 20, the latter connection being designed with a loose fit to allow such withdrawal.

A drawer type cage 30 is formed to slide longitudinally into the frame. The cage 30 is provided with end walls 32 and 34 and with mesh 36 on the sides and bottom to form with the mesh 27 on the top of the frame 24 (when the drawer 30 is inserted therein), a container for the foodstuffs when they are tumbled by rotation of the frame. The front end wall 34 of the drawer is dimensioned to overlap the inner edges of circular plate 26 to cover the entrance to the cooking area during the cooking operation. A handle 40 is provided on the drawer to allow its easy removal and insertion of the foodstuffs. The handle may be made collapsible or removable.

The heating of the gases by the heating elements is controlled in accord with a thermostat, not shown, having its sensor in the cooking compartment. The preferable mode of operation is for the thermostat to switch the heating elements on and off while leaving the fan running.

In operation, the device will most frequently be used with potato chips. The drawer 30 may be loaded wih these and inserted in the frame 24 and the fan and heater operated while the rotor rotates the frame 24 and drawer 30. We have found that, with potato chips, the temperature setting is, preferably between 400° F. and 460° F., most suitably 440° F. and that the cooking of the batch in the drawer requires 4–10 minutes depending on the amount of the foodstuffs being cooked and the size of the individual pieces. We have found that best speed for the gases, is a speed of 20 meters/sec at the edge of the frame nearer the opening 17. Obviously no accurate figures can be given for the resultant turbulent flow in the container and about the foodstuffs and the frame. However our best estimate would be that such flow would be between 12 and 30 meter/second.

Figure 2:
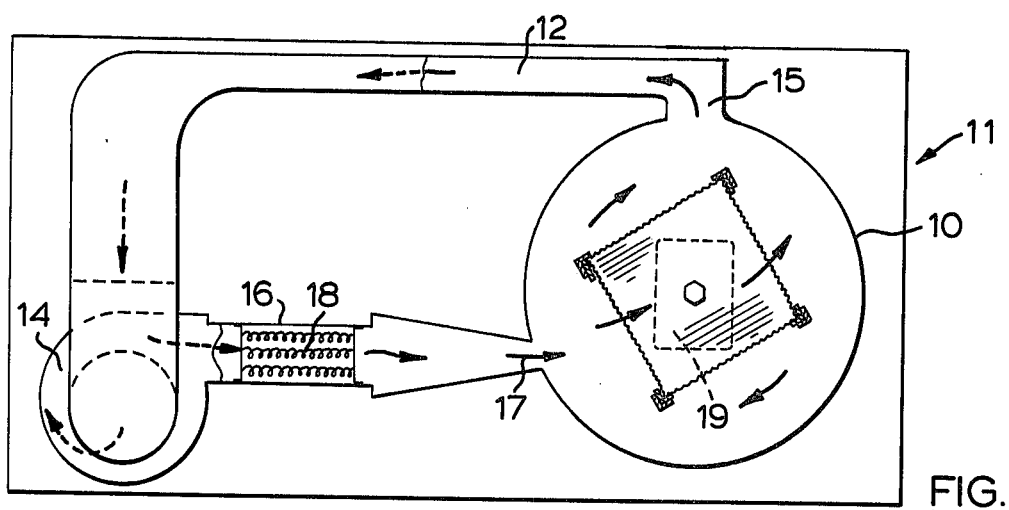
FIG. 2 is a diagramatic sectional side view of the device of FIG. 1.
Figure 3:
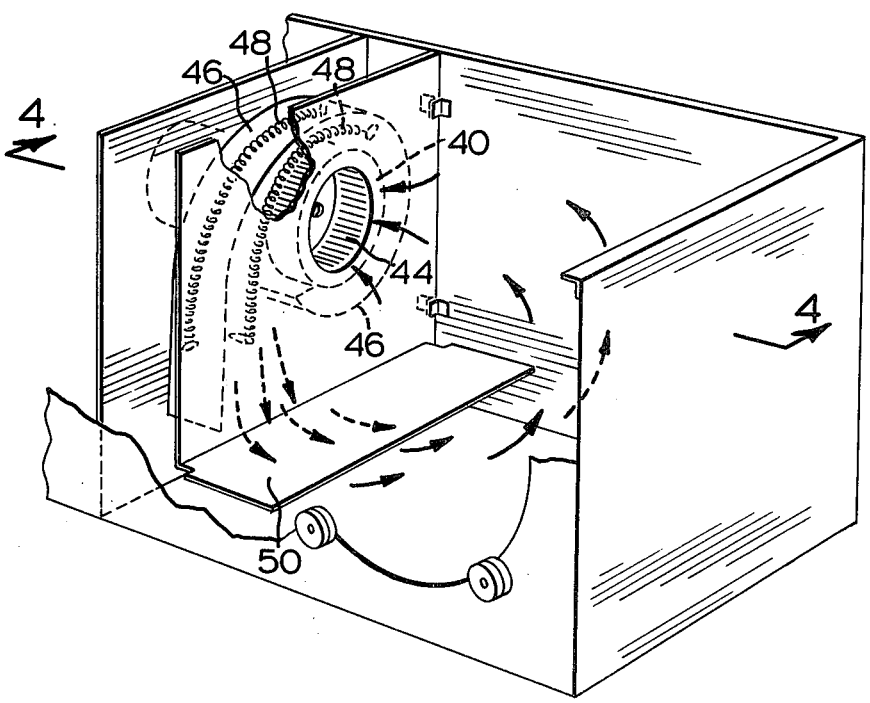
FIG. 3 is a partially broken away perspective view of another form of the invention.
Figure 4:
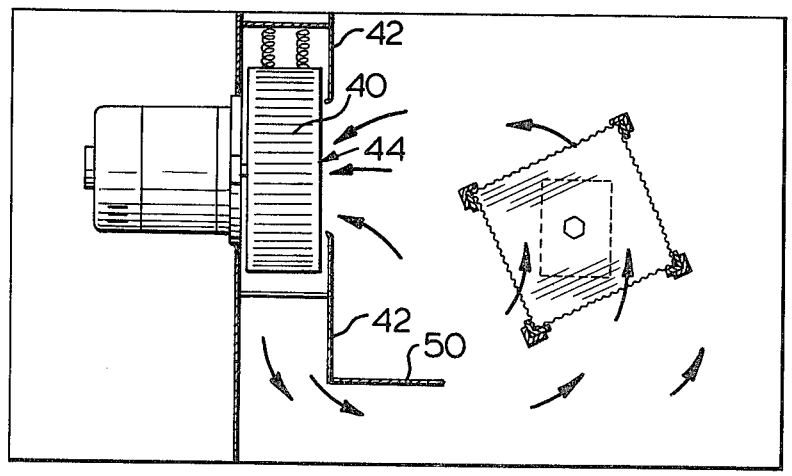
FIG. 4 is a diagramatic sectional side view of the form of the invention shown in FIG. 3.

In the alternative shown in FIGS. 3 and 4 the frame 24 and drawer 30 may be constructed in the same form as shown in FIGS. 1 and 2. The housing is modified to provide for the gas flow as described thereafter. A centrifugal fan 40 is again located laterally from the food area but with its axis directed theretowards. A wall 42 divides the cooking area from the area containing fan 40. The wall 42 is provided with a central aperture 44 allowing gases from the cooking area to reach the central intake of fan 40. The cylindrical wall 10 is omitted and the cooking area about frame 24 is defined by the housing walls and wall 42, as shown. The air impelled by fan 40 is caused to spiral outwards as guided by the scroll-type guides 46 over heating elements 48. Lower wall 50 is provided to guide the gases from fan 40 under wall 42 to enter the cooking area below frame 24.

The heat of 440° F. and frame impact velocity of the gases of approximately 20 meters/sec is preferred for this alternative also.

In both embodiments it will be seen that the air is supplied to the cooking area below the air exit therefrom.

In both embodiments it will be noted that the housing may easily be designed to have a removable side for easy cleaning of the interior.

In both embodiments the unloading and loading of successive batches is facilitated by the drawer construction.

The preferred embodiment shows a drawer-like container, designed to retain the foodstuffs on all sides but its top, combining with a frame for the drawer whose mesh completes the means for retaining the food. It is an obvious alternative and well within the scope of the invention, to provide a drawer with two end walls, four mesh side walls and means for inserting and removing the foodstuffs from the drawer. In such alternative the frame is just that without mesh. However it is believed that this arrangement will not be found as convenient as the preferred embodiment.

The exteriorly visible portion of the drawer may be provided with an arrow or other indication to indicate when the drawer is right side up, for withdrawal; and drives are available where the motor is automatically declutched, when stoped, to allow the drawer to be rotated to the right side up position for withdrawal. Drives may also be provided which will always stop the drawer right side up.

I claim:

1. Means for cooking foodstuffs comprising:
a substantially closed housing defined by walls,
a container for foodstuffs rotatably mounted in said housing, to rotate about a transverse axis whose major component is horizontal,
means for retaining foodstuffs in said container while said container is rotated by said rotation means,
the sides of said container disposed radially from the axis of rotation having openings to allow the passage of gases therethrough,
means for rotating said container about said axis,
said container being slidably removable along the axis of said rotatable mounting from said housing and from engagement with said rotating means,
an aperture in said housing allowing such slidable removal,
means for substantially closing said aperture when said container is rotatably mounted in said housing,
an impeller for gases arranged and designed to circulate the gases through said container,
means for heating the gases impelled by said impeller,
wherein said aperture closing means is mounted on said container for rotation therewith.

2. Means for cooking foodstuffs comprising:
a substantially closed housing defined by walls,
a container for foodstuffs rotatably mounted in said housing, to rotate about a transverse axis whose major component is horizontal,
means for retaining foodstuffs in said container while said container is rotated by said rotation means,
the sides of said container disposed radially from the axis of rotation having openings to allow the passage of gases therethrough,
means for rotating said container about said axis,
said container being slidably removable along the axis of said rotatable mounting from said housing and from engagement with said rotating means,
an aperture in said housing allowing such slidable removal,
means for substantially closing said aperture when said container is rotatably mounted in said housing,
an impeller for gases arranged and designed to circulate the gases through said container,
means for heating the gases impelled by said impeller,
wherein said aperture closing means is mounted on said container and comprises a circular plate rotatable outside a wall of said housing and closing the aperture therein.

3. Means as claimed in claim 2 wherein the periphery of said circular plate is coaxial with the axis of rotation of said container and wherein rollers on the exterior of said housing support said plate for rotation of said plate and said container on said axis, and wherein the rotatable mounting for said container comprises said rollers and plate at one end of said frame and a rotatable mounting at the other end of said container.

* * * * *